US007554801B2

(12) United States Patent  (10) Patent No.: US 7,554,801 B2
Bailey et al.  (45) Date of Patent: Jun. 30, 2009

(54) LOCKOUT DEVICE FOR REMOVABLE MEDIA

(75) Inventors: Mark M. Bailey, Burnet, TX (US); Richard S. Mills, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 225 days.

(21) Appl. No.: 11/486,507

(22) Filed: Jul. 14, 2006

(65) Prior Publication Data

US 2008/0013260 A1  Jan. 17, 2008

(51) Int. Cl.
G06F 1/16 (2006.01)
H05K 5/00 (2006.01)
H05K 7/00 (2006.01)

(52) U.S. Cl. ...................... 361/685; 439/680
(58) Field of Classification Search ................. 361/685, 361/740; 439/680, 681
See application file for complete search history.

(56) References Cited

U.S. PATENT DOCUMENTS

| 4,941,841 | A |  | 7/1990 | Darden et al. |
| 5,668,696 | A |  | 9/1997 | Schmitt |
| 5,902,155 | A | * | 5/1999 | Polgar et al. ................. 439/680 |
| 5,975,735 | A |  | 11/1999 | Schmitt |
| 6,088,222 | A |  | 7/2000 | Schmitt et al. |
| 6,282,087 | B1 |  | 8/2001 | Gibbons et al. |
| 6,733,343 | B2 | * | 5/2004 | Morita et al. ................ 439/680 |
| 6,808,428 | B1 | * | 10/2004 | Korsunsky et al. .......... 439/680 |
| 7,081,024 | B2 | * | 7/2006 | Karadimas et al. .......... 439/680 |
| 7,139,166 | B2 |  | 11/2006 | Marcade et al. |
| 2007/0268661 | A1 |  | 11/2007 | Wobig et al. |

FOREIGN PATENT DOCUMENTS

JP  8203257  8/1996

OTHER PUBLICATIONS

Office Action for Chinese Utility Model Application No. 200720156616.3 (2 pages), dated Feb. 1, 2008.
Austrian Search and Examination Report for Application No. 200704270-8, (7 pages), dated Jul. 4, 2008.

* cited by examiner

Primary Examiner—Javaid Nasri
(74) Attorney, Agent, or Firm—Baker Botts L.L.P.

(57) ABSTRACT

A device for preventing unauthorized entry of a removable media into a receptor. A key is attached to the removable media and a lock is attached to the receptor. If the key does not fit the lock, the lock prevents the removable media from fully entering the receptor. If the key does fit the lock, the lock will permit the removable media to fully enter the receptor.

20 Claims, 4 Drawing Sheets

LOCKOUT DEVICE FOR REMOVABLE MEDIA

TECHNICAL FIELD

The present disclosure relates generally to computer systems and information handling systems, and, more particularly, to a lockout device for removal media of a computer system or information handling system.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

An information handling system or computer system may include a hard drive or other removable media that is coupled to the chassis of a computer or a drive bay. A hard drive is typically disposed on a carrier assembly, often referred to as a hard drive carrier, and the carrier assembly is inserted, via a guide rail system, into a bay in a computer chassis. The hard drive carrier serves as a protective housing for the hard drive and mechanically mates with a drive bay in a computer chassis.

SUMMARY

In accordance with the present disclosure, a device for preventing unauthorized entry of a removable media into a receptor is disclosed that includes a key attached to the removable media and a lock attached to the receptor. If the key fits the lock, the lock will permit the removable media to fully enter the receptor. If the key does not fit the lock, the lock will prevent the removable media from fully entering the receptor. The key and the lock may have a first tooth position. If the lock has a tooth in the first tooth position, and the key has a tooth in the first tooth position, the key will not fit the lock. Similarly, the key and the lock may have a second tooth position and a third tooth position. Additionally, the lock may attach to the receptor such that the lock will prevent the removable media from fully entering the receptor if a length of a groove in the key is insufficient. The lock may permit the removable media to fully enter the receptor if the length of the groove is sufficient.

The device disclosed herein is technically advantageous because its physical design is able to accommodate many different configurations of keys and locks. Three tooth positions and two lock positions provide at least sixteen different key configurations and at least sixteen different lock configurations.

Another technical advantage of the device and method disclosed herein is the ability of the keys to work on various locks, and the ability of the locks to accept various keys. This allows the assignment of different key and lock configurations, depending on desired access. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a person computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
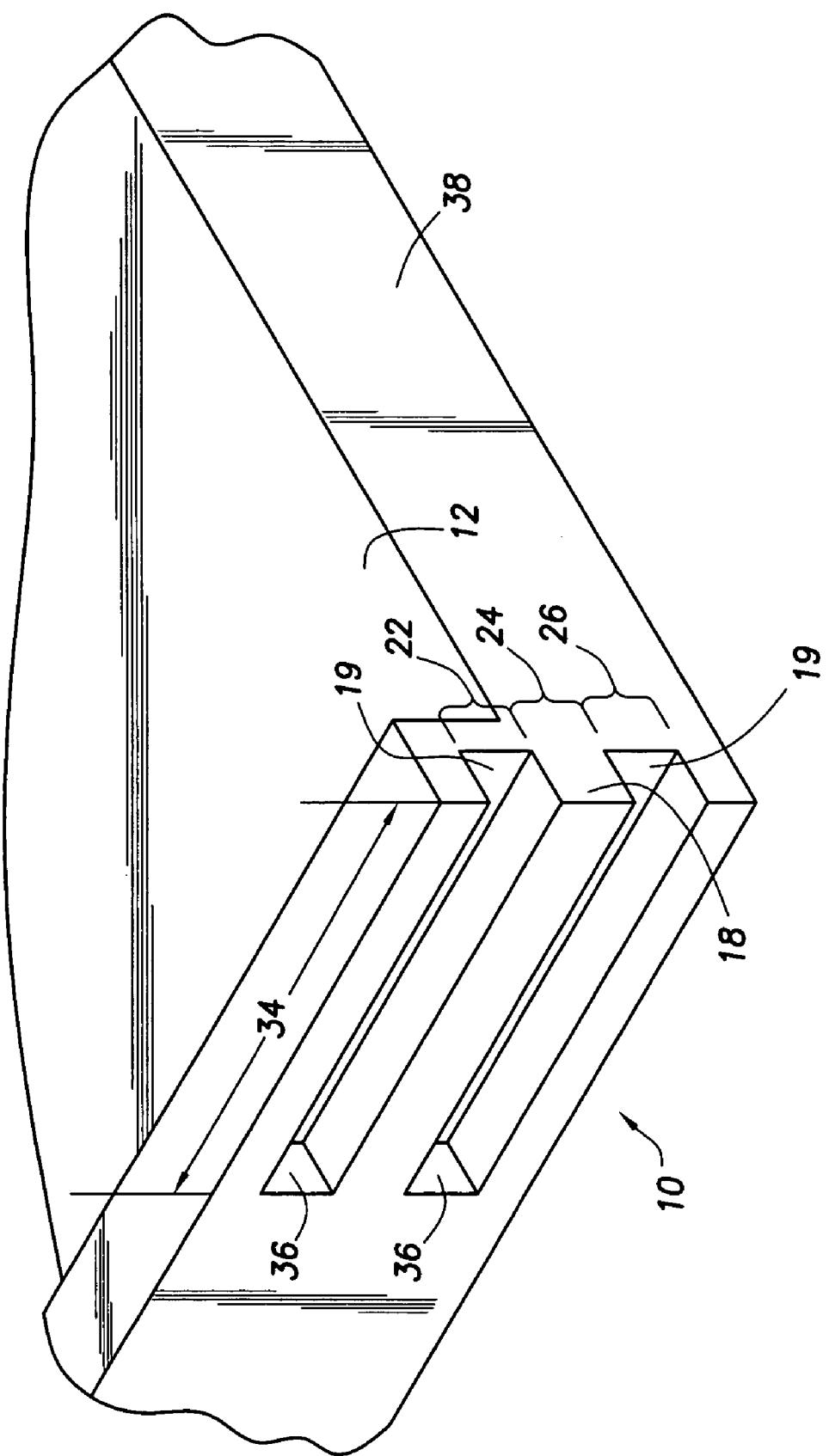
FIG. 1 is a perspective view of a key attached to a removable media device.
Figure 2:
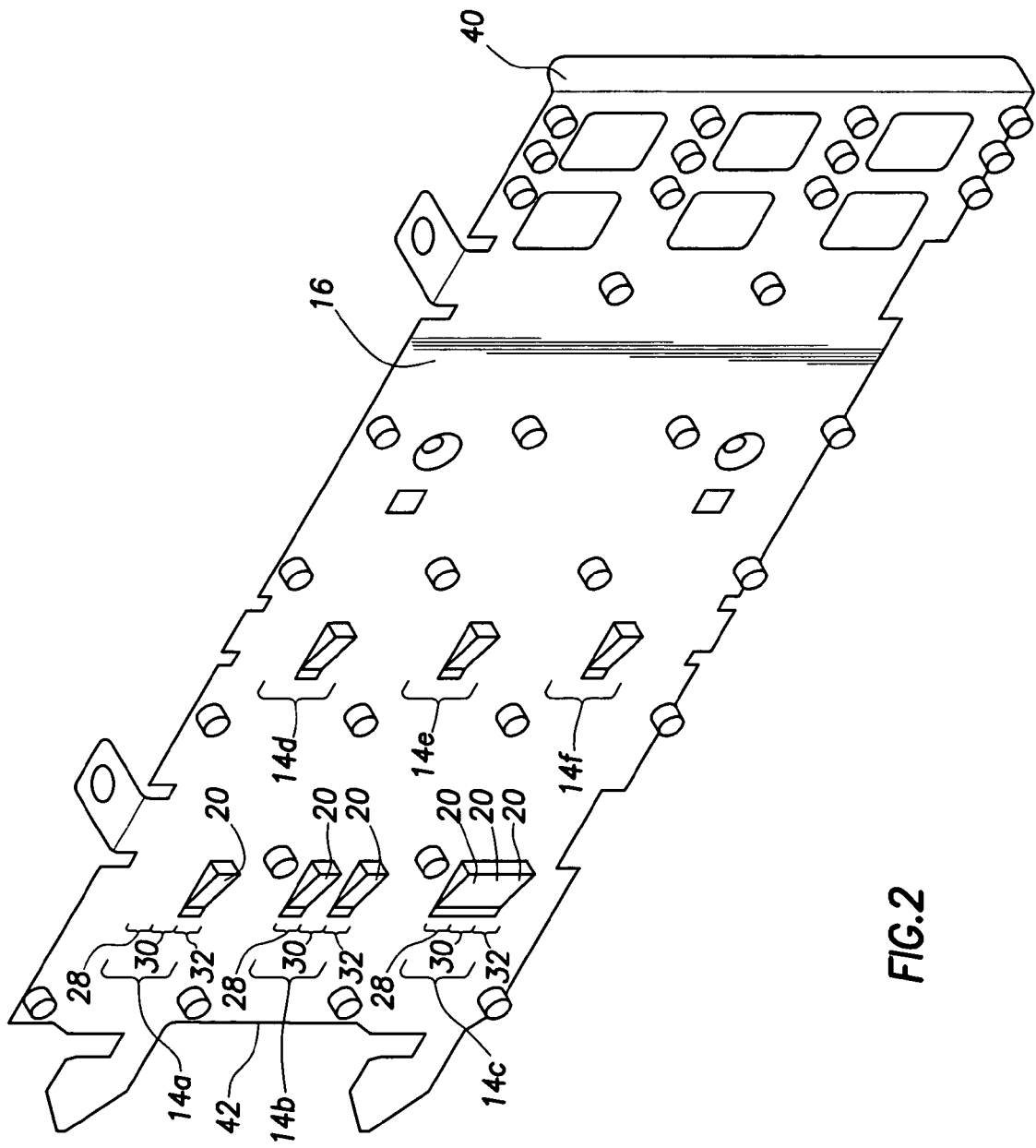
FIG. 2 is a perspective view of a lock attached to a receptor.

Shown in FIG. 1 is a perspective view of a key, which is indicated generally at 10. Key 10 is shown as integrally formed with a guide rail of a hard drive carrier. Key 10 may be attached to a hard drive or other removable media 12 via the guide rail or otherwise. In one embodiment, the key 10 is formed by machining grooves in the guide rail. Shown in FIG. 2 is a perspective view of a lock, which is indicated generally at 14. Lock 14 is shown as integrally formed with a chassis. Lock 14 is attached, either directly or indirectly, to a chassis or other receptor 16. In one embodiment, the lock 14 is formed by pushing tabs away from the chassis.

The key 10 may have any number of ridges or key teeth 18 and any number of key grooves 19. The key 10 shown in FIG. 1 has one key tooth 18 and two key grooves 19. Likewise, the lock 14 may have any number of ridges or lock teeth 20, including no lock teeth 20 at all. The lock 14a of FIG. 2 has one lock tooth 20, the lock 14b has two lock teeth 20, and the lock 14c has three lock teeth 20 (the lock teeth 20 are connected in this instance for ease of manufacture). The key 10 of FIG. 1 has a first key tooth position 22, a second key tooth position 24, and a third key tooth position 26. Likewise, the lock 14 of FIG. 2 has a first lock tooth position 28, a second lock tooth position 30, and a third lock tooth position 32.

When the removable media 12 enters the receptor 16, a back 38 of the removable media 12 is inserted into a front 40 of the receptor 16 and the removable media 12 is moved toward a back 42 of the receptor 16. When the removable media 12 enters the receptor 16, the first key tooth position 22 aligns with the first lock tooth position 28, and the term "first tooth position" could interchangeably refer to either. Likewise, the term "second tooth position" may refer to either the second key tooth position 24 or the second lock tooth position 30. Finally, the term "third tooth position" may refer to either the third key tooth position 26 or the third lock tooth position 32.

Therefore, when a key tooth 18 is present in the first key tooth position 22, the first tooth position is filled, and the key 10 will not fit within any lock 14 having a lock tooth 20 in the first lock tooth position 28. Similarly, when a key tooth 18 is present in the second key tooth position 24, the second tooth position is filled, and the key 10 will not fit within any lock 14 having a lock tooth 20 in the second lock tooth position 30. Likewise, when a key tooth 18 is present in the third key tooth position 26, the third tooth position is filled, and the key 10 will not fit within any lock 14 having a lock tooth 20 in the third lock tooth position 32.

In addition to the use of three or more tooth positions, the position of the lock 14 on the receptor 16, and a length 34 of the key grooves 19 may be used to prevent unauthorized entry of the removable media 12 into the receptor 16. A first key end or hard stop 36 at the end of the key grooves 19 will prevent the key 10 from extending past the lock 14. The hard stop 36 prevents the removable media 12 from going too far into the receptor 16, and helps to secure the removable media 12 in place. Generally, when the lock 14 is toward the back 42 of the receptor 16, as shown by locks 14a, 14b, and 14c, the key grooves 19 may be shorter, and when the lock 14 is toward the front 40 of the receptor 16, as shown by locks 14d, 14e, and 14f, the key grooves 19 are longer. When the length 34 of the key grooves 19 is large, the removable media 12 will be able to pass completely into the receptor 16, regardless of whether the lock 14 is toward the front 40 of the receptor 16 or toward the back 42 of the receptor 16. However, when the length 34 of the key grooves 19 is small, and the lock 14 is toward the back 42 of the receptor 16, the removable media 12 will only be able to partially enter the receptor 16.

With three tooth positions, and two key groove lengths 34, there are at least sixteen different keys 10. Similarly, three tooth positions and two lock positions support at least sixteen different locks 14. However, many of the keys 10 are compatible with several of the locks 14, and many of the locks 14 will accept several different keys 10. For instance, when there are no key teeth 18 present, and the length 34 is large, the key 10 will fit any lock 14. When there are no lock teeth 20 present, and the lock 14 is toward the back 42 of the receptor 16, any key 10 will fit the lock 14. It may be desirable that the key 10 fit some locks 14, while being excluded from others. For example, a first manufacturer may want to allow its removable media 12 to enter the receptors 16 of a second manufacturer and a third manufacturer, while preventing the removable media 12 of the second and third manufacturers from entering the receptors 16 of the first manufacturer. Additionally, the first manufacturer may want to prevent its removable media 12 from entering the receptors 16 of a fourth manufacturer.

Figure 3A:
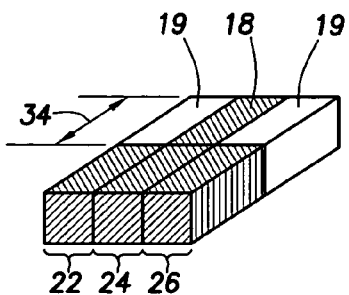
FIGS. 3A-3I are schematic views of various key configurations.
Figure 3B:
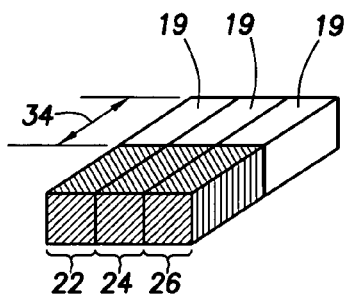
Figure 3C:
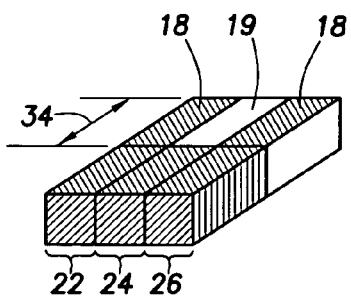

There are a number of other combinations of key teeth 18 that may be assigned to various removable media 12. For example, FIG. 3A shows the first manufacturer's configuration for a single channel device may have the key tooth 18 only in the second key tooth position 24, and the length 34 of the key grooves 19 may be small. FIG. 3B shows the first manufacturer's configuration for a dual channel device may have no key teeth 18, and the length 34 of the key grooves 19 may be small. FIG. 3C shows the first manufacturer's configuration for a future removable media may have key teeth 18 in the first key tooth position 22, and the third key tooth position 26, and the length 34 of the key grooves 19 may be small.

Figure 3D:
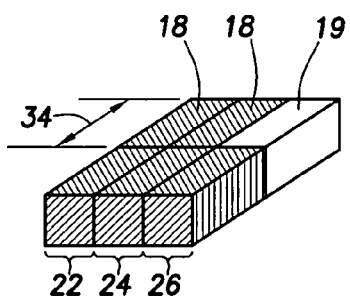
Figure 3E:
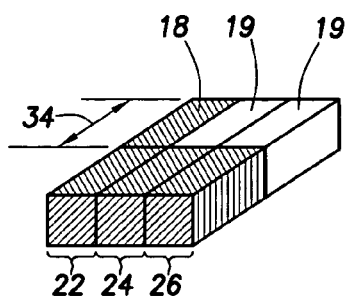

Additional assignments may be made for the second manufacturer. For instance, the second manufacturer's configuration for a single channel device may have key teeth 18 in the first key tooth position 22, and the second key tooth position 24, and the length 34 of the key grooves 19 may be small, as shown in FIG. 3D. FIG. 3E shows the second manufacturer's configuration for a dual channel device may have the key tooth 18 only in the first key tooth position 22, and the length 34 of the key grooves 19 may be small.

Figure 3F:
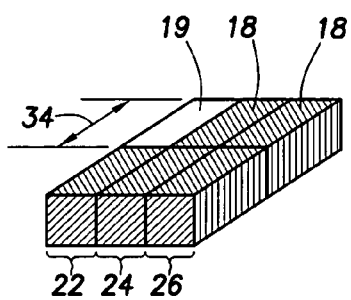
Figure 3G:
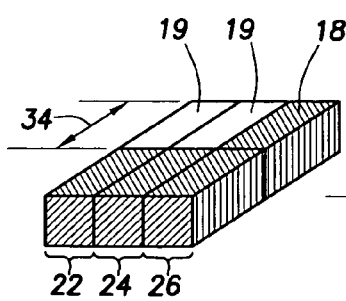

Likewise, the third manufacturer may have assignments. For example, the third manufacturer's configuration for a single channel device may have key teeth 18 in the second key tooth position 24, and the third key tooth position 26, and the length 34 of the key grooves 19 may be small, as shown in FIG. 3F. FIG. 3G shows the third manufacturer's configuration for a dual channel device may have the key tooth 18 only in the third key tooth position 26 and the length 34 of the key grooves 19 may be small.

Figure 3H:
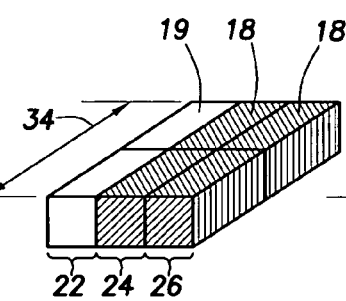
Figure 3I:
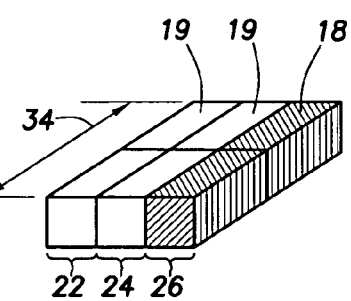

Additionally, the fourth manufacturer may be assigned certain key configurations. For instance, the fourth manufacturer's configuration for a single channel device may have the key teeth 18 in the second key tooth position 24 and the third key tooth position 26 and the length 34 of the key grooves 19 may be large, as shown in FIG. 3H. FIG. 3I shows the fourth manufacturer's configuration for a dual channel device may have key tooth 18 only in the third key tooth position 26, and the length 34 of the key grooves 19 may be large. If needed, additional assignments could be made, particularly when adding additional key teeth 18 and varying the length 34 of key grooves 19.

Figure 4A:
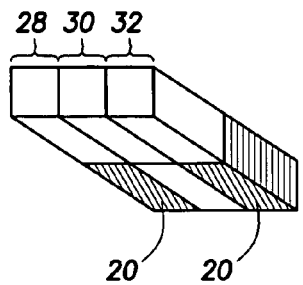
FIGS. 4A-4I are schematic views of various lock configurations.
Figure 4B:
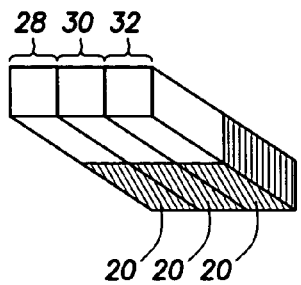
Figure 4C:
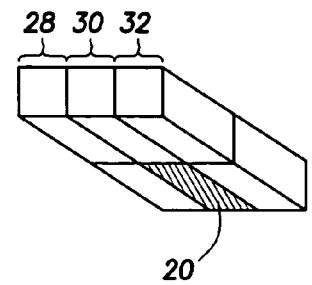

There are also a number of combinations of lock teeth 20 that may be assigned to various receptors 16. FIG. 4A shows the first manufacturer's configuration for a server may have lock teeth 20 in the first lock tooth position 28, and the third lock tooth position 32, and be toward the back of the receptor 16. FIG. 4B shows the first manufacturer's configuration for a storage device may have lock teeth 20 in the first lock tooth position 28, the second lock tooth position 30 and the third lock tooth position 32, and be toward the back 42 of the receptor 16. FIG. 4C shows the first manufacturer's configuration for a future receptor may have lock tooth 20 only in the second lock tooth position 30, and be toward the back 42 of the receptor 16.

Figure 4D:
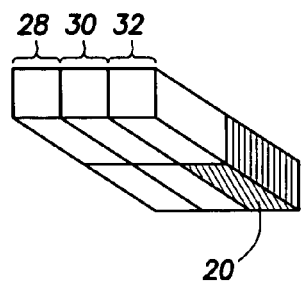
Figure 4E:
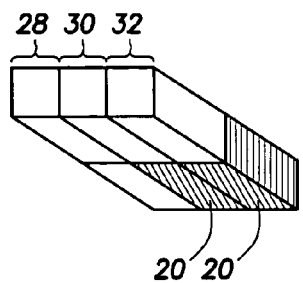

The second manufacturer's configuration for a server may have lock tooth 20 only in the third lock tooth position 32, and be toward the back 42 of the receptor 16, as shown in FIG. 4D. FIG. 4E shows the second manufacturer's configuration for a storage device may have lock teeth 20 in the second lock tooth position 30, and the third lock tooth position 32, and be toward the back 42 of the receptor 16.

Figure 4F:
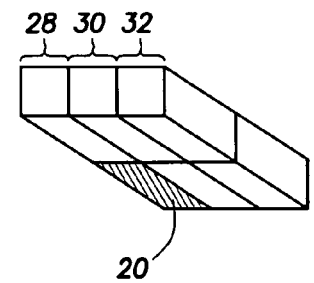
Figure 4G:
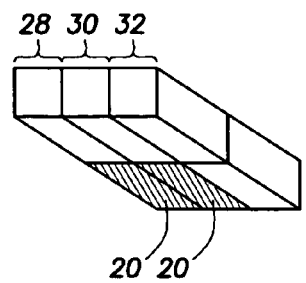

The third manufacturer's configuration for a server may have lock tooth 20 only in the first lock tooth position 28, and be toward the back 42 of the receptor 16, as shown in FIG. 4F. FIG. 4G shows the third manufacturer's configuration for a storage device may have lock teeth 20 in the first lock tooth position 28, and the second lock tooth position 30, and be toward the back 42 of the receptor 16.

Figure 4H:
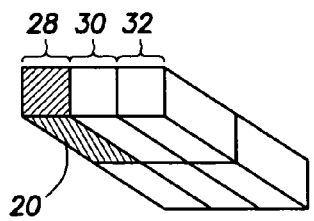
Figure 4I:
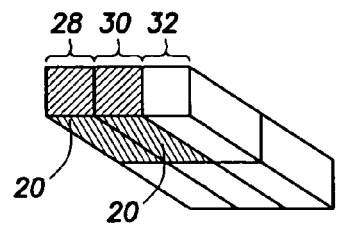

The fourth manufacturer's configuration for a server may have lock tooth 20 only in the first lock tooth position 28, and be toward the front 40 of the receptor 16, as shown in FIG. 4H. FIG. 4I shows the fourth manufacturer's configuration for a storage device may have lock teeth 20 in the first lock tooth position 28, and the second lock tooth position 30, and be toward the front 40 of the receptor 16. If needed, additional assignments could be made, particularly when adding additional lock teeth 20, and varying the position of the lock 14.

Any given key will only fit certain locks. For example, the first manufacturer's single channel device (FIG. 3A) would fit within the first manufacturer's server (FIG. 4A), the second manufacturer's server (FIG. 4D), and the third manufacturer's server (FIG. 4F), but not the first manufacturer's storage device (FIG. 4B), the first manufacturer's future receptor (FIG. 4C), the second manufacturer's storage device (FIG. 4E), the third manufacturer's storage device (FIG. 4G), the fourth manufacturer's server (FIG. 4H), or the fourth manufacturer's storage device (FIG. 4I). Note that the reason that the first manufacturer's single channel device would not fit within the fourth manufacturer's server is due to the hard stop 36, and not teeth.

The first manufacturer's dual channel device (FIG. 3B) would fit within the first manufacturer's server (FIG. 4A), the first manufacturer's storage device (FIG. 4B), the first manufacturer's future receptor (FIG. 4C), the second manufacturer's server (FIG. 4D), the second manufacturer's storage device (FIG. 4E), the third manufacturer's server (FIG. 4F), and the third manufacturer's storage device (FIG. 4G), but not the fourth manufacturer's server (FIG. 4H), or the fourth manufacturer's storage device (FIG. 4I). Note that the reason that the first manufacturer's dual channel device would not fit within the fourth manufacturer's server or the fourth manufacturer's storage device is due to the hard stop 36, and not teeth.

The first manufacturer's future removable media (FIG. 3C) would fit within the first manufacturer's future receptor (FIG. 4C), but not the first manufacturer's server (FIG. 4A), the first manufacturer's storage device (FIG. 4B), the second manufacturer's server (FIG. 4D), the second manufacturer's storage device (FIG. 4E), the third manufacturer's server (FIG. 4F), the third manufacturer's storage device (FIG. 4G), the fourth manufacturer's server (FIG. 4H), or the fourth manufacturer's storage device (FIG. 4I).

The second manufacturer's single channel device (FIG. 3D) would fit within the second manufacturer's server (FIG. 4D), but not the first manufacturer's server (FIG. 4A), the first manufacturer's storage device (FIG. 4B), the first manufacturer's future receptor (FIG. 4C), the second manufacturer's storage device (FIG. 4E), the third manufacturer's server (FIG. 4F), the third manufacturer's storage device (FIG. 4G), the fourth manufacturer's server (FIG. 4H), or the fourth manufacturer's storage device (FIG. 4I).

The second manufacturer's dual channel device (FIG. 3E) would fit within the first manufacturer's future receptor (FIG. 4C), the second manufacturer's server (FIG. 4D), and the second manufacturer's storage device (FIG. 4E), but not within the first manufacturer's server (FIG. 4A), the first manufacturer's storage device (FIG. 4B), the third manufacturer's server (FIG. 4F), the third manufacturer's storage device (FIG. 4G), the fourth manufacturer's server (FIG. 4H), or the fourth manufacturer's storage device (FIG. 4I).

The third manufacturer's single channel device (FIG. 3F) would fit within the third manufacturer's server (FIG. 4F), but not the first manufacturer's server (FIG. 4A), the first manufacturer's storage device (FIG. 4B), the first manufacturer's future receptor (FIG. 4C), the second manufacturer's server (FIG. 4D), the second manufacturer's storage device (FIG. 4E), the third manufacturer's storage device (FIG. 4G), the fourth manufacturer's server (FIG. 4H), or the fourth manufacturer's storage device (FIG. 4I). Note that the reason that third manufacturer's single channel device would not fit within the fourth manufacturer's server is due to the hard stop 36, and not teeth.

The third manufacturer's dual channel device (FIG. 3G) would fit within the first manufacturer's future receptor (FIG. 4C), the third manufacturer's server (FIG. 4F), and the third manufacturer's storage device (FIG. 4G), but not the first manufacturer's server (FIG. 4A), the first manufacturer's storage device (FIG. 4B), the second manufacturer's server (FIG. 4D), the second manufacturer's storage device (FIG. 4E), the fourth manufacturer's server (FIG. 4H), or the fourth manufacturer's storage device (FIG. 4I). Note that the reason that third manufacturer's dual channel device would not fit within the fourth manufacturer's server or the fourth manufacturer's storage device is due to the hard stop 36, and not teeth.

The fourth manufacturer's single channel device (FIG. 3H) would fit within the third manufacturer's server (FIG. 4F) and the fourth manufacturer's server (FIG. 4H), but not the first manufacturer's server (FIG. 4A), the first manufacturer's storage device (FIG. 4B), the first manufacturer's future receptor (FIG. 4C), the second manufacturer's server (FIG. 4D), the second manufacturer's storage device (FIG. 4E), the third manufacturer's storage device (FIG. 4G), or the fourth manufacturer's storage device (FIG. 4I).

The fourth manufacturer's dual channel device (FIG. 3I) would fit within the first manufacturer's future receptor (FIG. 4C), the third manufacturer's server (FIG. 4F), the third manufacturer's storage device (FIG. 4G), the fourth manufacturer's server (FIG. 4H), and the fourth manufacturer's storage device (FIG. 4I), but not the first manufacturer's server (FIG. 4A), the first manufacturer's storage device (FIG. 4B), the second manufacturer's server (FIG. 4D), or the second manufacturer's storage device (FIG. 4E).

Although the present disclosure has been described in detail, it should be understood that various changes, substitutions, and alterations can be made hereto without departing from the spirit and the scope of the invention as defined by the appended claims.

What is claimed is:

1. A device for preventing unauthorized entry of a removable media into a receptor, the device comprising:
   a key attached to the removable media, wherein the key has one or more key tooth positions, and wherein each of the key tooth positions is operable to couple directly to one or more key grooves; and
   a plurality of locks attached to the receptor so as to form at least two columns of locks, wherein each of the locks has one or more lock tooth positions that align with the key tooth positions, wherein each of the lock tooth positions is divided into one or more lock spacings, and wherein each of the lock spacings is operable to couple directly to a lock tooth;
   wherein, the lock will prevent the removable media from fully entering the receptor if the key does not fit the lock; and wherein, the lock will permit the removable media to fully enter the receptor if the key fits the lock.

2. The device of claim 1, wherein the lock is attached to the receptor such that the lock will prevent the removable media from fully entering the receptor if a length of at least one groove in the key is insufficient, and the lock will permit the removable media to fully enter the receptor if the length of the at least one groove is sufficient.

3. The device of claim 1, further comprising a first tooth position, wherein if the lock has a tooth in the first tooth position, and the key has a tooth in the first tooth position, the key will not fit the lock.

4. The device of claim 3, further comprising a second tooth position, wherein if the lock has a tooth in the second tooth position, and the key has a tooth in the second tooth position, the key will not fit the lock.

5. The device of claim 4, further comprising a third tooth position, wherein if the lock has a tooth in the third tooth position, and the key has a tooth in the third tooth position, the key will not fit the lock.

6. The device of claim 5, wherein the lock is attached to the receptor such that the lock will prevent the removable media from fully entering the receptor if a length of at least one groove in the key is insufficient, and the lock will permit the removable media to fully enter the receptor if the length of the at least one groove is sufficient.

7. The device of claim 6, wherein the key fits more than one lock.

8. The device of claim 6, wherein more than one key fits the lock.

9. A method for preventing unauthorized entry of a removable media into a receptor, the method comprising:
   providing a key attached to the removable media, wherein the key has one or more key tooth positions, and wherein each of the key tooth positions is operable to couple directly to one or more key grooves;
   placing the key into the receptor, wherein a plurality of locks are attached to the receptor so as to form at least two columns of locks, wherein each of the locks has one or more lock tooth positions that align with the key tooth positions, wherein each of the lock tooth positions is divided into one or more lock spacings, and wherein each of the lock spacings is operable to couple directly to a lock tooth; and
   wherein, if the key does not fit a lock attached to the receptor, the lock will prevent the removable media from fully entering the receptor; and wherein, if the key fits the lock, the lock will permit the removable media to fully enter the receptor.

10. The method of claim 9, further comprising attaching the lock to the receptor such that the lock will prevent the removable media from fully entering the receptor if a length of at least one groove in the key is insufficient, and the lock will permit the removable media to fully enter the receptor if the length of the at least one groove is sufficient.

11. The method of claim 9, further comprising providing a first tooth position, wherein if the lock has a tooth in the first tooth position, and the key has a tooth in the first tooth position, the key will not fit the lock.

12. The method of claim 11, further comprising providing a second tooth position, wherein if the lock has a tooth in the second tooth position, and the key has a tooth in the second tooth position, the key will not fit the lock.

13. The method of claim 12, further comprising providing a third tooth position, wherein if the lock has a tooth in the third tooth position, and the key has a tooth in the third tooth position, the key will not fit the lock.

14. A method for preventing unauthorized entry of a removable media into a receptor, the method comprising:
   providing a lock attached to the receptor so as to form at least two columns of locks, wherein each of the locks has one or more lock tooth positions that align with the key tooth positions, wherein each of the lock tooth positions is divided into one or more lock spacings, and wherein each of the lock spacings is operable to couple directly to a lock tooth;
   placing a key into the receptor, wherein a pluralty of locks are attached to the receptor so as to form at least two columns of locks, wherein each of the locks has one or more lock tooth positions that align with the key tooth positions, wherein each of the lock tooth positions is divided into one or more lock spacings, and wherein each of the lock spacings is operable to couple directly to a lock tooth; and
   wherein, if the key attached to the removable media does not fit the lock, the lock will prevent the removable media from fully entering the receptor; and
   wherein, if the key fits the lock, the lock will permit the removable media to fully enter the receptor.

15. The method of claim 14 further comprising: providing the key attached to the removable media.

16. The method of claim 14, further comprising attaching the lock to the receptor such that the lock will prevent the removable media from fully entering the receptor if a length of at least one groove in the key is insufficient, and the lock will permit the removable media to fully enter the receptor if the length of the at least one groove is sufficient.

17. The method of claim 14, further comprising providing a first tooth position, wherein if the lock has a tooth in the first tooth position, and the key has a tooth in the first tooth position, the key will not fit the lock.

18. The method of claim 17, further comprising providing a second tooth position, wherein if the lock has a tooth in the second tooth position, and the key has a tooth in the second tooth position, the key will not fit the lock.

19. The method of claim 18, further comprising providing a third tooth position, wherein if the lock has a tooth in the third tooth position, and the key has a tooth in the third tooth position, the key will not fit the lock.

20. The method of claim 19, further comprising:
   providing the key attached to the removable media; and
   attaching the lock to the receptor such that the lock will prevent the removable media from fully entering the receptor if a length of at least one groove in the key is insufficient, and the lock will permit the removable media to fully enter the receptor if the length of the at least one groove is sufficient.

* * * * *